United States Patent
Muramatsu et al.

(10) Patent No.: US 11,258,986 B2
(45) Date of Patent: Feb. 22, 2022

(54) OBSERVATION SYSTEM AND OBSERVATION METHOD

(71) Applicant: FUJITSU LIMITED, Kawasaki (JP)

(72) Inventors: Hiroshi Muramatsu, Numazu (JP); Koichi Takaba, Numazu (JP); Masato Fushimi, Shizuoka (JP); Katsumi Yamada, Numazu (JP); Masaru Endoh, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/249,956

(22) Filed: Jan. 17, 2019

(65) Prior Publication Data
US 2019/0230322 A1 Jul. 25, 2019

(30) Foreign Application Priority Data
Jan. 19, 2018 (JP) .............................. JP2018-006962

(51) Int. Cl.
*H04N 7/18* (2006.01)
*H04L 67/12* (2022.01)
(Continued)

(52) U.S. Cl.
CPC .......... *H04N 7/181* (2013.01); *G06F 21/566* (2013.01); *G06F 21/6218* (2013.01);
(Continued)

(58) Field of Classification Search
CPC ... H04N 7/181; G06F 21/566; G06F 21/6218; G06F 21/83; H04B 7/14; H04L 67/12
See application file for complete search history.

(56) References Cited

U.S. PATENT DOCUMENTS

2003/0208693 A1  11/2003  Yoshida
2007/0064107 A1*  3/2007  Aggarwal ............. G01S 3/7864
                                                     348/143
(Continued)

FOREIGN PATENT DOCUMENTS

JP  11-110677  4/1999
JP  2003-323365  11/2003
(Continued)

OTHER PUBLICATIONS

JPOA—Office Action of Japanese Patent Application No. 2018-006962 dated Aug. 3, 2021 with English Machine translation.

*Primary Examiner* — Hesham K Abouzahra
(74) *Attorney, Agent, or Firm* — Fujitsu Patent Center

(57) ABSTRACT

An observation system includes a first sensor configured to observe a first portion of an observation target, a second sensor configured to observe a second portion of the observation target, and a control device including a memory and a processor coupled to the memory, the processor being configured to receive first observation data from the first sensor via a first relay device and second observation data from the second sensor via a second relay device, wherein the first observation data is not transmitted from the first sensor to the second relay device when the first observation data is transmitted from the first sensor to the control device via the first relay device, and the second observation data is not transmitted from the second sensor to first relay device when the second observation data is transmitted from the second sensor to the control device via the second relay device.

20 Claims, 12 Drawing Sheets

(51) Int. Cl.
  *G06F 21/56* (2013.01)
  *G06F 21/62* (2013.01)
  *H04B 7/14* (2006.01)
  *G06F 21/83* (2013.01)

(52) U.S. Cl.
  CPC ............... *G06F 21/83* (2013.01); *H04B 7/14* (2013.01); *H04L 67/12* (2013.01); *G06F 2221/034* (2013.01)

(56) References Cited

U.S. PATENT DOCUMENTS

| | | | | |
|---|---|---|---|---|
| 2013/0002868 | A1* | 1/2013 | Yoshimitsu | G06T 7/292 |
| | | | | 348/143 |
| 2016/0150183 | A1* | 5/2016 | Nagamine | H04N 7/152 |
| | | | | 348/14.08 |
| 2017/0076085 | A1 | 3/2017 | Miura | |
| 2017/0142373 | A1* | 5/2017 | Black | H04N 7/181 |

FOREIGN PATENT DOCUMENTS

| | | |
|---|---|---|
| JP | 2006-3958 | 1/2006 |
| JP | 2009-44386 | 2/2009 |
| JP | 2013-025391 | 2/2013 |
| JP | 2017-102537 | 6/2017 |
| WO | 2015/181925 | 12/2015 |

\* cited by examiner

FIG. 3

| LABEL INFORMATION | | IMAGE DATA |
|---|---|---|
| CAMERA | OBSERVATION TARGET PORTION | |
| 4-1 | X1 | ............ |
| 4-4 | X2 | ............ |
| 4-7 | X3 | ............ |
| 4-2 | Y1 | ............ |
| 4-5 | Y2 | ............ |
| 4-8 | Y3 | ............ |
| 4-3 | Z1 | ............ |
| 4-6 | Z2 | ............ |
| 4-9 | Z3 | ............ |

FIG. 4

| OBSERVATION TARGET | OBSERVATION TARGET PORTION | CAMERA | RELAY DEVICE |
|---|---|---|---|
| X | X1 | 4-1 | 3A |
| X | X2 | 4-4 | 3B |
| X | X3 | 4-7 | 3C |
| Y | Y1 | 4-2 | 3A |
| Y | Y2 | 4-5 | 3B |
| Y | Y3 | 4-8 | 3C |
| Z | Z1 | 4-3 | 3A |
| Z | Z2 | 4-6 | 3B |
| Z | Z3 | 4-9 | 3C |

FIG. 6

| OBSERVATION TARGET | 1 | 2 | 3 |
|---|---|---|---|
| X | 4-1 | 4-4 | 4-7 |
| Y | 4-2 | 4-5 | 4-8 |
| Z | 4-3 | 4-6 | 4-9 |

| OBSERVATION TARGET | 1 | 2 | 3 |
|---|---|---|---|
| X | 4-1 | 4-4 | 4-7 |
| Y | – | 4-5 | 4-8 |
| Z | 4-3 | 4-6 | 4-9 |

| OBSERVATION TARGET | 1 | 2 | 3 |
|---|---|---|---|
| X | – | 4-4 | 4-7 |
| Y | 4-1 | 4-5 | 4-8 |
| Z | 4-3 | 4-6 | 4-9 |

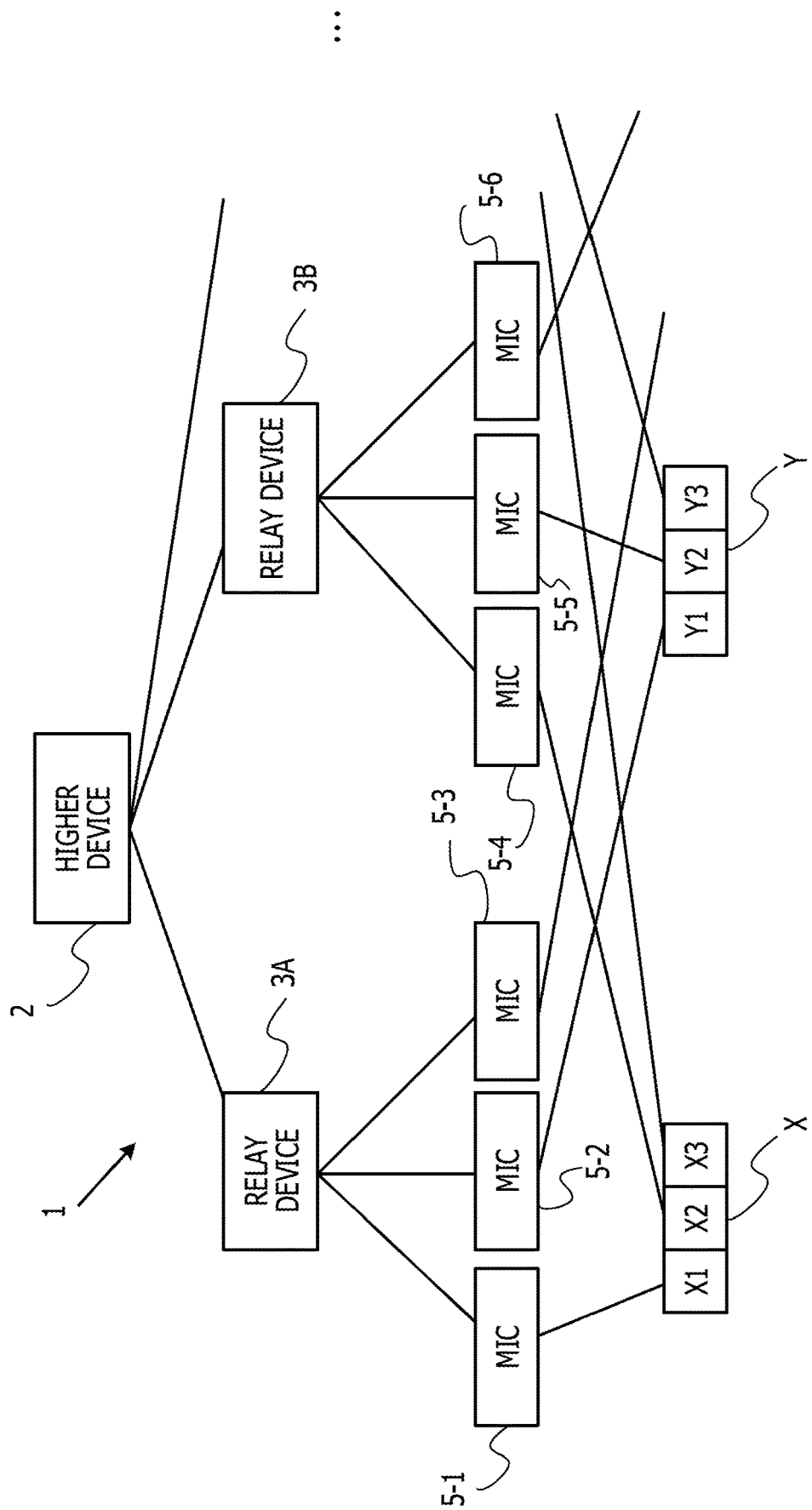

OBSERVATION SYSTEM AND OBSERVATION METHOD

CROSS-REFERENCE TO RELATED APPLICATION

This application is based upon and claims the benefit of priority of the prior Japanese Patent Application No. 2018-6962, filed on Jan. 19, 2018, the entire contents of which are incorporated herein by reference.

FIELD

The embodiment discussed herein is related to an observation technique.

BACKGROUND

Nowadays, the Internet of Things (IoT), in which things such as cameras, sensors, devices, and so forth are connected to the Internet, is widely used. In the IoT, for example, information from a plurality of cameras is collected by relay devices, and the relay devices transmit the information to a higher computer.

As a related-art technique, a technique relating to access authentication has been proposed. With this technique, a security level is flexibly changeable in the case where a use environment of a peripheral device varies.

Furthermore, a technique has been proposed with which, in a communication network, sensor devices are effectively used while the security is ensured. Furthermore, a technique has been proposed with which identical information is quickly transferred to observing devices that require the information without using advanced encoding of information to be transferred, authentication processing, hardware such as dedicated boards, or software.

Related art is disclosed in, for example, Japanese Laid-open Patent Publication Nos. 2013-25391, 2017-102537, and 11-110677.

SUMMARY

According to an aspect of the embodiments, an observation system includes a first sensor configured to observe a first portion of an observation target, a second sensor configured to observe a second portion of the observation target, and a control device including a memory and a processor coupled to the memory, the processor being configured to receive first observation data from the first sensor via a first relay device and second observation data from the second sensor via a second relay device, wherein the first observation data is not transmitted from the first sensor to the second relay device when the first observation data is transmitted from the first sensor to the control device via the first relay device, and the second observation data is not transmitted from the second sensor to first relay device when the second observation data is transmitted from the second sensor to the control device via the second relay device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of transmission data;

FIG. 4 illustrates an example of the relationships between observation targets, observation target portions, cameras, and relay devices;

FIG. 6 is a first view illustrating an example of a control table;

FIG. 12 illustrates another example of the observation system.

DESCRIPTION OF EMBODIMENTS

With the related art, when data of a plurality of cameras is transmitted to a higher computer through a relay device, the data collected in the relay device may leak to the outside through the Internet due to a malicious attack on the relay device.

In some cases, the data collected from the plurality of the cameras is, for example, confidential information, personal information, or the like. In such cases, an attack on the relay device in which the data is collected causes damage in which confidential information, personal information, or the like leaks to the outside.

<An Example of an Observation System>

Figure 1:
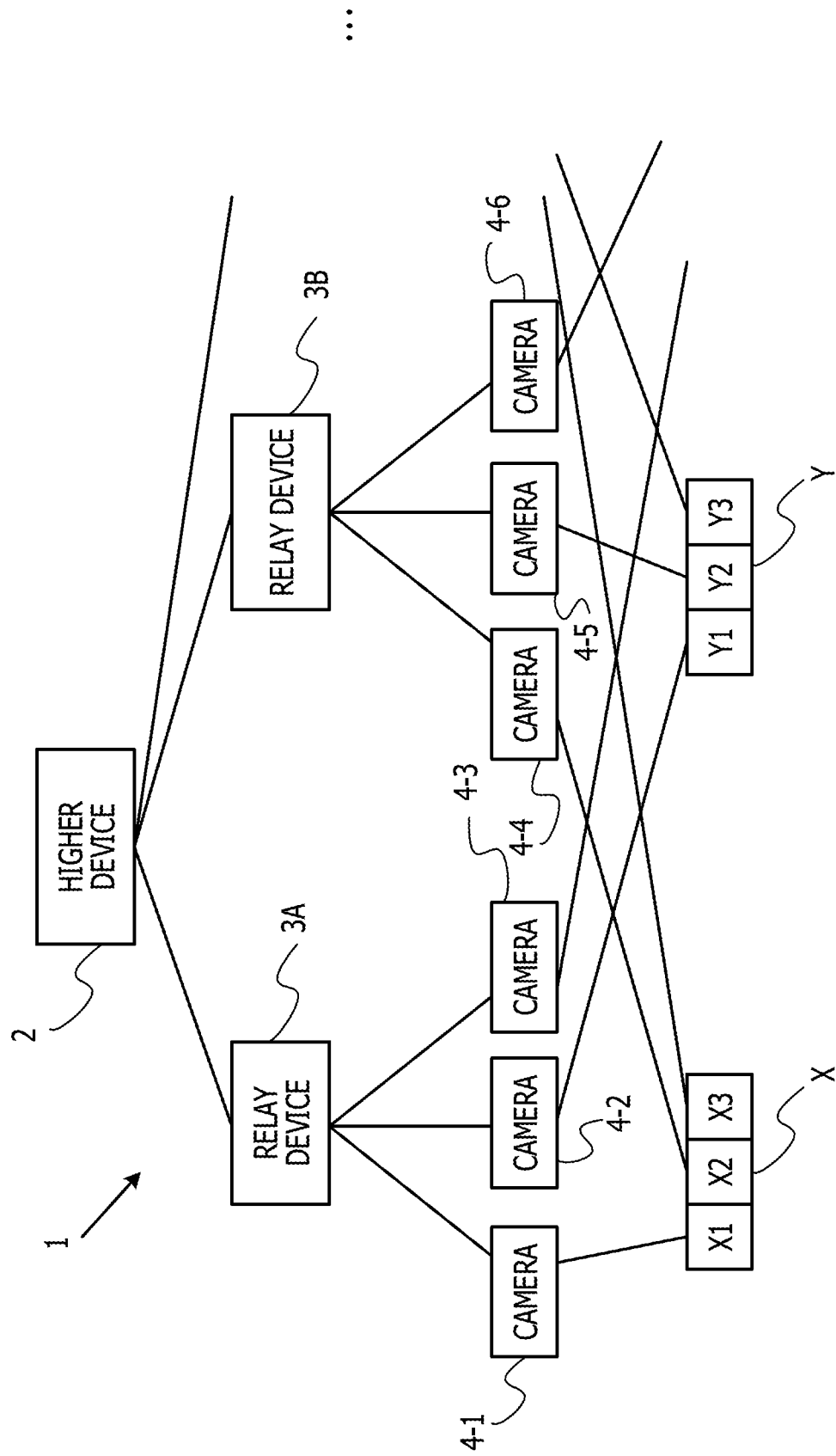
FIG. 1 illustrates an example of an observation system.

The embodiment is described below with reference to the drawings. FIG. 1 illustrates an example of an observation system 1. In the observation system 1 illustrated in the example of FIG. 1, relay devices 3A, 3B are connected to a higher device 2. A relay device 3C (not illustrated) is also connected to the higher device 2. The relay devices 3A to 3C may be collectively referred to as the relay devices 3 hereinafter. Any number of the relay devices 3 may be connected to the higher device 2.

The higher device 2 performs processing for the embodiment and is an example of an information processing device or a control device. The higher device 2 is also referred to as an Internet of things (IoT) gateway.

The relay devices 3 is an example of a first relay section (first relay unit) or a second relay section (second relay unit). In some cases, the relay device 3A is the first relay section and the relay device 3B is the second relay section. In other cases, the relay device 3A is the second relay section and the relay device 3B is the first relay section.

Three cameras 4-1 to 4-3 are connected to the relay device 3A. Three cameras 4-4 to 4-6 are connected to the relay device 3B. It is assumed that three cameras 4-7 to 4-9 (not illustrated) are connected to the relay device 3C. The cameras 4-1 to 4-9 may be collectively referred to as the cameras 4 hereinafter.

Any number of the cameras 4 may be connected to the relay devices 3. The cameras 4 are examples of a first observing section, a second observing section, or another observing section. For example, in some cases, the camera 4-1 is the first observing section and the camera 4-4 is the second observing section. In other cases, the camera 4-4 is the first observing section and the camera 4-1 is the second observing section.

The camera 4-1 corresponding to the first observing section and the camera 4-4 corresponding to the second observing section belong to the different relay devices 3. The camera 4-2 may be the other observing section, and the camera 4-1 corresponding to the first observing section and the camera 4-2 corresponding to the other observing section belong to the same relay device 3.

As illustrated in the example of FIG. 1, the cameras 4 capture images of (observe) an observation target X and an observation target Y as observation targets. It is assumed that the cameras 4 capture images of (observe) an observation target Z (not illustrated) as the observation target. Any number of the observation targets may be provided.

As illustrated in the example of FIG. 1, the observation target X is divided into observation target portions X1, X2, X3, and the observation target Y is divided into observation target portions Y1, Y2, Y3. Likewise, the observation target Z is assumed to be divided into observation target portions Z1, Z2, Z3. The observation target portions are examples of one portion or the other portion of the observation target.

An image of the observation target portion X1 is captured by the camera 4-1 belonging to the relay device 3A. An image of the observation target portion X2 is captured by the camera 4-4 belonging to the relay device 3B. An image of the observation target portion X3 is captured by the camera 4-7 belonging to the relay device 3C.

Thus, the images of the different observation target portions X1, X2, X3 of the observation target X are captured by the cameras 4 belonging to the different relay devices 3. This also similarly applies to the observation target portions Y1, Y2, Y3 of the observation target Y and the observation target portions Z1, Z2, Z3 of the observation target Z.

For example, in the case where the entirety of the observation target X fits within an image-capturing field of view of the camera 4-1, the camera 4-1 may obtain, out of captured image data, image data of the observation target portion X1 with regions of the observation target portions X2, X3 deleted. In this case, the image data of the observation target portion X1 is stored in image memory in the camera 4-1. The image data is an example of observation data.

Alternatively, the image-capturing field of view of the camera 4-1 may be the observation target portion X1 of the observation target X, the image-capturing field of view of the camera 4-2 may be the observation target portion X2 of the observation target X, and the image-capturing field of view of the camera 4-3 may be the observation target portion X3 of the observation target X.

This also similarly applies to the observation target Y the images of which are to be captured by the cameras 4-4 to 4-6 belonging to the relay device 3B and the observation target Z the images of which are to be captured by the cameras 4-7 to 4-9 belonging to the relay device 3C.

From the above description, for example, the relay device 3A as the first relay section is configured so that, when the relay device 3A receives the image data of the observation target portion X1 as first observation data, the relay device 3A does not receive the image data of the observation target portion X2 as second observation data. In addition, the relay device 3B as the second relay section is configured so that, when the relay device 3B receives the image data of the observation target portion X2 as the second observation data, the relay device 3B does not receive the image data of the observation target portion X1 as the first observation data.

In the example illustrated in FIG. 1 according to the embodiment, the images of the observation target portions X1, X2, X3 are captured by the cameras 4 belonging to the different relay devices 3. Here, a different case is described in which the images of the observation target portions X1, X2, X3 are captured by the cameras 4 belonging to the same relay device 3.

For example, it is assumed that the cameras 4-1 to 4-3 capture the images of the observation target portions X1, X2, X3 of the observation target X. In this case, pieces of the image data captured by the cameras 4-1 to 4-3 are transmitted to the relay device 3A. For example, the pieces of the image data relating to the observation target portions X1, X2, X3 of the observation target X are collected in the relay device 3A.

It is assumed that the observation target X is a person, and the observation target portions X1 to X3 are the pieces of image data corresponding to three equally divided portions of an image of the person. When the pieces of the image data of the observation target portions X1 to X3 are collected in the relay device 3A, the pieces of the image data of the observation target portions X1 to X3 are stored in the relay device 3A.

In the IoT, the cameras 4 and the relay devices 3 are connected to the Internet. Thus, the relay device 3A may become under control of an external computer due to a malicious attack on the relay device 3A from the external computer. In this case, collecting the pieces of image data of the observation target portions X1 to X3 in the relay device 3A may lead to leakage of image data identifying a person.

In the case where the observation target X is confidential information, personal information, or the like, allowing the relay device 3A to be under the control of an external computer due to a malicious attack may lead to leakage of data of the confidential information, personal information, or the like.

In this regard, for example, the image data in transmission may be encoded by the cameras 4 and decoded by the higher device 2. This is able to reduce a risk of information leakage of the image data of the observation target portions X1 to X3. However, since the cameras 4 have poor hardware resources, it is difficult for the cameras 4 to perform advanced encoding on the image data.

Thus, according to the embodiment, as illustrated in the example of in FIG. 1, the images of the different observation target portions X1, X2, X3 of the observation target X are captured by the cameras 4 belonging to the different relay devices 3. The piece of the image data of the observation target portion X1 is transmitted to the relay device 3A, the piece of the image data of the observation target portion X2 is transmitted to the relay device 3B, and the piece of the image data of the observation target portion X3 is transmitted to the relay device 3C.

According to the embodiment, even when the relay device 3A is attacked by an external computer and the image data leaks, the image data that leaks is the piece of the image data of the observation target portion X1 and the pieces of the image data of the observation target portions X2 and X3 do not leak.

As described above, when the observation target X is a person, the piece of the image data of the observation target portion X1 is of part of the image of the person. Thus, it is difficult to identify the person only with the piece of the image data of the observation target portion X1. For example, even when a portion of the observation target X leaks, damage caused by the leakage may be suppressed.

The higher device 2 having richer hardware resources than those of the cameras 4 and the relay devices 3 is able to take an advanced security measure. Thus, even when the pieces of the image data of the observation target portions X1 to X3 are collected in the higher device 2, a risk of leakage of information is low.

<An Example of the Higher Device>

Figure 2:
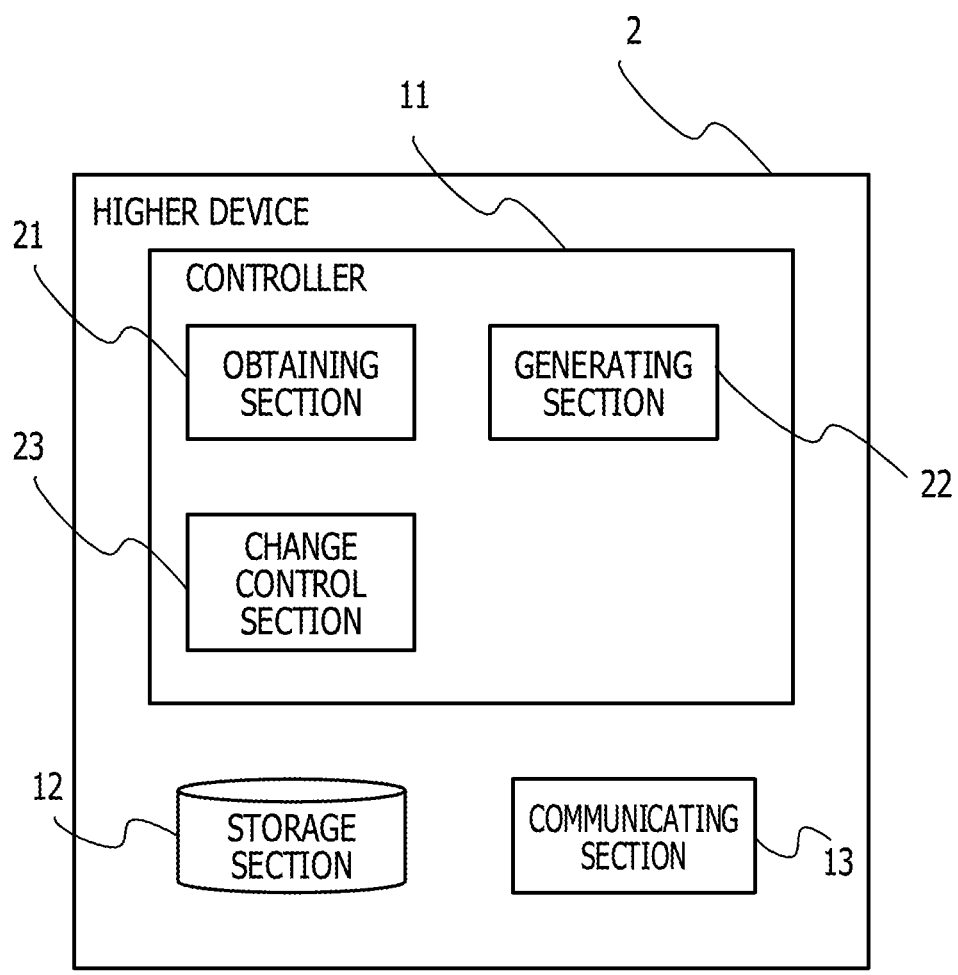
FIG. 2 is a functional block diagram illustrating an example of a higher device.

Referring next to FIG. 2, an example of the higher device 2 is described. The higher device 2 includes a controller 11, a storage section 12, and a communicating section 13. The controller 11 performs various types of control according to the embodiment. The storage section 12 stores various types of data. The communicating section 13 performs communication with the relay devices 3, the Internet, and so forth.

An obtaining section 21 obtains through the communicating section 13 transmission data that includes the pieces of the image data of the observation target portions and label information identifying the observation target portions transmitted from the relay devices 3. The label information is an example of first identifying information or second identifying information.

The generating section 22 generates image data of each of the observation targets from the pieces of the image data of a plurality of the observation target portions based on the label information correlated to the image data. For example, the generating section 22 generates image data of the observation target X from the pieces of the image data of the observation target portions X1 to X3.

For example, in a situation in which the camera 4-7 fails, the obtaining section 21 obtains the pieces of the image data of the observation target portions X1, X2 out of the image data of the observation target X. In this case, the generating section 22 generates image data of a part including the observation target portions X1, X2 from the pieces of the image data of the observation target portions X1, X2.

When a change control section 23 accepts from one of the relay devices 3 a request for a change in an observation range of one of the cameras 4 belonging to this relay device 3, the change control section 23 performs control so as to determine whether to permit the change in the observation range and transmit an instruction on whether the change in the observation range is permitted to the source of the change request.

<An Example of the Transmission Data>

FIG. 3 illustrates an example of the transmission data transmitted from the relay devices 3 to the higher device 2. The transmission data includes the label information and the image data. The label information includes information indicative of the observation target portions and information identifying the cameras 4.

As described above, regarding the observation target portions, the generating section 22 generates the image data including the observation target portions based on the label information and the pieces of the image data. For example, the generating section 22 generates the image data of the observation target X from the pieces of the image data of three observation target portions X1 to X3 based on the label information respectively correlated to the observation target portions X1 to X3.

As illustrated in the example of FIG. 3, the label information includes information identifying the cameras 4. The cameras 4 each capture an image of a predetermined portion of the observation target. With the label information including the information identifying the cameras 4, whether the transmission data is from the cameras 4 correlated to the observation target portions is recognizable.

For example, in the case where the correspondences between the information indicative of the observation target portions and the information identifying the cameras 4 are stored in the storage section 12, the obtaining section 21 refers to the correspondences stored in the storage section 12 when the transmission data is obtained.

When the correspondences between the information indicative of the observation target portions and the information identifying the cameras 4 included in the transmission data are different from the correspondences stored in the storage section 12, the obtaining section 21 is able to determine that the transmission data is not from the cameras 4 assigned to the observation target portions.

<An Example of the Relationships Between the Observation Targets, the Observation Target Portions, the Cameras, and the Relay Devices>

FIG. 4 illustrates an example of the relationships between the observation targets, the observation target portions, the cameras, and the relay devices. As illustrated in the example of FIG. 4, the image of the observation target portion X1 of the observation target X is captured by the camera 4-1 belonging to the relay device 3A.

The image of the observation target portion X2 of the observation target X is captured by the camera 4-4 belonging to the relay device 3B. The image of the observation target portion X3 of the observation target X is captured by the camera 4-7 belonging to the relay device 3C.

The images of the different observation target portions X1 to X3 are captured by the cameras 4 belonging to the different relay devices 3. Accordingly, for example, even when the relay device 3A out of the relay devices 3A to 3C becomes under control of an external computer due to a malicious attack, the image data that may leak is the piece of the image data of the observation target portion X1 out of the image data of the observation target X.

As described above, when the observation target X is a person, the piece of the image data of the observation target portion X1 is one of the pieces of image data corresponding to three equally divided portions of an image of the person. Thus, it is difficult to identify the person only with the piece of the image data of the observation target portion X1.

In other words, when all of the plurality of pieces of the image data of the observation target portions are provided, the plurality of pieces of the image data of the observation target portions have a meaning. Accordingly, even when one of the plurality of pieces of the image data of the observation target portions leaks, damage caused by the data leakage may be suppressed.

This also similarly applies to the observation target portions Y1 to Y3 of the observation target Y and the observation target portions Z1 to Z3 of the observation target Z.

<An Example of Change Control Performed on the Observation Range>

Figure 5:
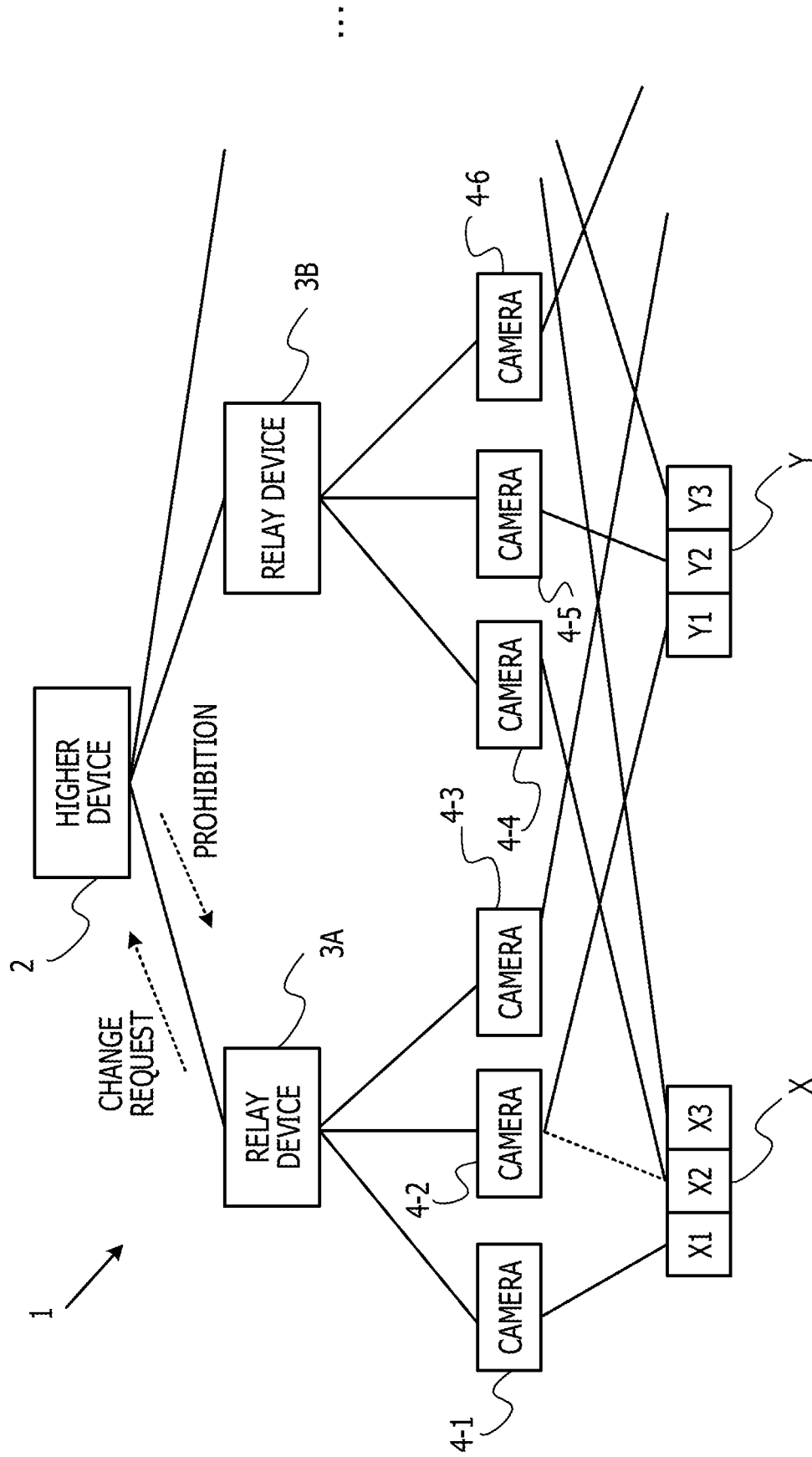
FIG. 5 is a first explanatory view of an example of control for changing an observation range.

Referring next to FIG. 5, an example of control for changing the observation range is described. For example, in order for the relay device 3A to change the observation range (image-capturing range) of the camera 4-2 to the observation target portion X2, the relay device 3A transmits to the higher device 2 a request for the change in the image-capturing range of the camera 4-2.

The above-described change request includes information indicative of a candidate replacement observation target portion (in the above-described case, information indicative of the observation target portion X2). In and after FIG. 5, the relationships with the candidate replacement observation target portions included in the change request are indicated by broken lines.

Based on the information indicative of the candidate replacement observation target portion included in the change request, the change control section 23 prohibits the change in the image-capturing range when the image of the candidate replacement observation target portion is captured by the other camera 4. In contrast, the change control section 23 permits the change in the image-capturing range when the image of the candidate replacement observation target portion is not captured by any of the cameras 4.

FIG. 6 illustrates an example of a control table. The control table is stored in the storage section 12. In the control table, "X" to "Z" indicate the observation targets. The portions of the observation targets are indicated by "1" to "3" in the control table. Cells are filled with information identifying the cameras 4.

For example, a cell corresponding to "X" and "1" in the control table indicates the observation target portion X1. In the cell of the observation target portion X1, information identifying the camera 4-1 is recorded. In other words, the control table indicates that the image of the observation target portion X1 is captured by the camera 4-1.

Upon accepting a change request for changing the image-capturing range of one of the cameras 4 from one of the relay devices 3, the change control section 23 refers to the control table stored in the storage section 12. Based on the information indicative of the candidate replacement observation target portion included in the accepted change request, the change control section 23 determines which one of the cameras 4 captures the image of the candidate replacement observation target portion.

For example, when the change control section 23 accepts a change request from the relay device 3A for changing the image-capturing range of the camera 4-2 to the observation target portion X2, the change control section 23 refers to a cell corresponding to "X" and "2" in the control table. In this cell, information "4-4" is recorded. In other words, the image of the observation target portion X2 is captured by the camera 4-4.

In the above-described case, the change control section 23 prohibits the change in the image-capturing range for the change request from the relay device 3A. The change control section 23 transmits to the relay device 3A through the communicating section 13 an instruction to prohibit the change in the image-capturing range of the camera 4-2 based on the change request.

Allowing the plurality of the cameras 4 to capture the image of the same observation target portion increases the possibility that the plurality of the cameras 4 belonging to the same relay device 3 capture the image of the same observation target.

For example, in the example illustrated in FIG. 5, allowing the camera 4-2 to capture the image of the observation target portion X2 causes the piece of the image data of the observation target portion X1 captured by the camera 4-1 and the pieces of the image data of the observation target portion X2 captured by the camera 4-2 to be transmitted to the relay device 3A.

From two pieces of the image data, that is, the piece of the image data of the observation target portion X1 and the piece of the image data of the observation target portion X2, image data of many portions of the observation target X is obtainable. When the pieces of the image data of the observation target portions X1, X2 leak due to a malicious attack on the relay device 3A from an external computer, it is difficult to suppress damage caused by the leakage of the image data.

Thus, when the change control section 23 prohibits capturing of the image of the same observation target portion by the plurality of the cameras 4, the damage caused by the leakage of the image data may be suppressed.

Figure 7:
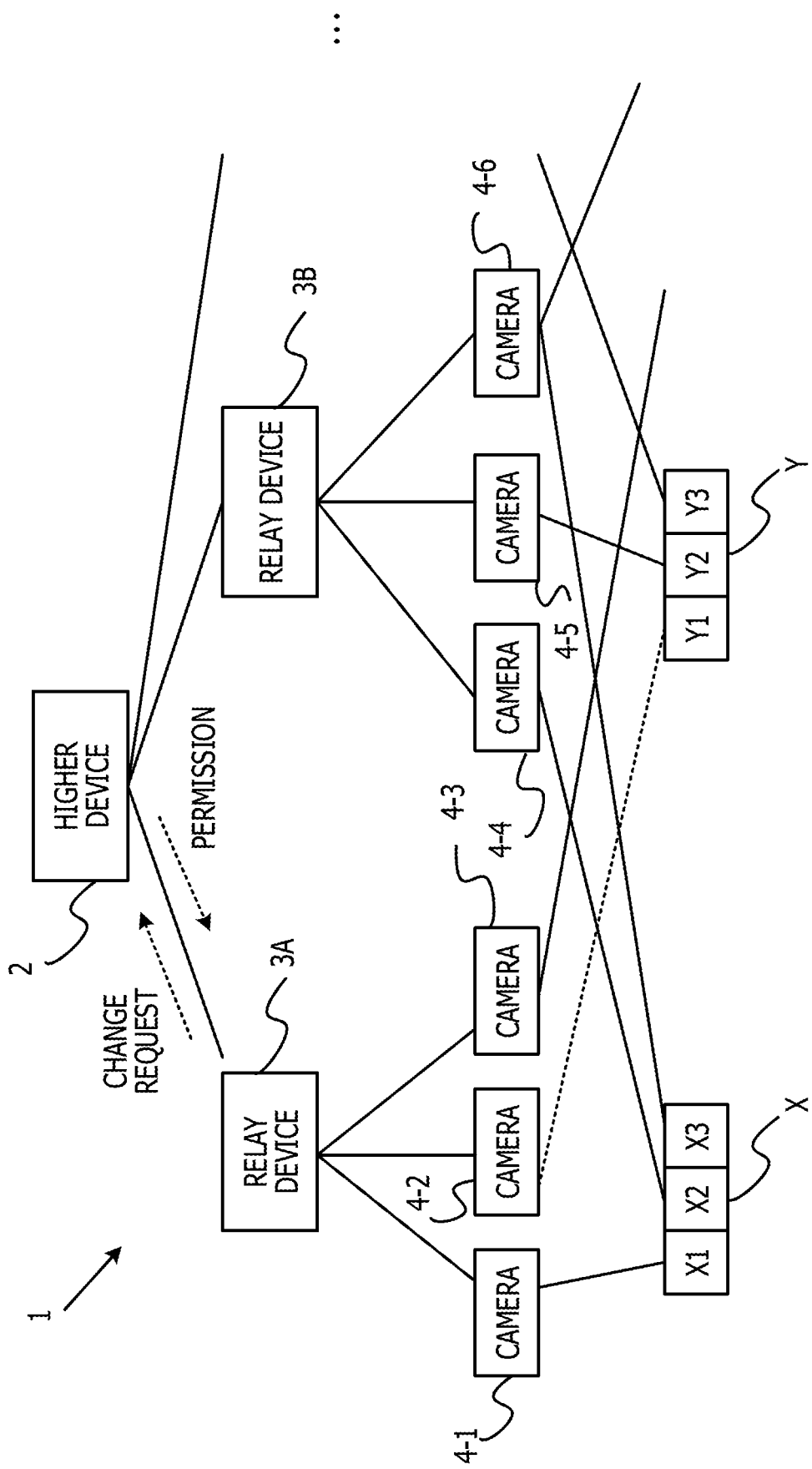
FIG. 7 is a second explanatory view of an example of the control for changing the observation range.

FIG. 7 illustrates an example in which the change request is permitted. It is assumed that the relay device 3A transmits to the higher device 2 a change request for changing the image-capturing range of the camera 4-1 to the observation target portion Y1. The change control section 23 of the higher device 2 refers to the control table stored in the storage section 12.

Figure 8:
FIG. 8 is a second view illustrating an example of the control table.

Referring to FIG. 8, in an example of the control table, information is not recorded in a cell corresponding to "Y" and "1" (cell indicative of the observation target portion Y1). Thus, the image of the observation target portion Y1 is not captured by any of the cameras 4, and accordingly, the change control section 23 transmits an instruction to permit a change in the image-capturing range of the camera 4-1 based on the change request.

Based on the above-described instruction, the relay device 3A changes the image-capturing range of the camera 4-1 from the observation target portion X1 to the observation target portion Y1. In this case, the image of the observation target portion X1 is not captured by any of the cameras 4.

In addition to the transmission of the above-described instruction, the change control section 23 records the information "4-1" in the cell corresponding to "Y" and "1" and deletes the information recorded in the cell corresponding to "X" and "1". As a result, the control table indicates that the image of the observation target portion Y1 is captured by the camera 4-1 whereas the image of the observation target portion X1 is not captured by any of the cameras 4.

<A Flowchart Illustrating an Example of a Flow of Processing According to the Embodiment>

Figure 9:
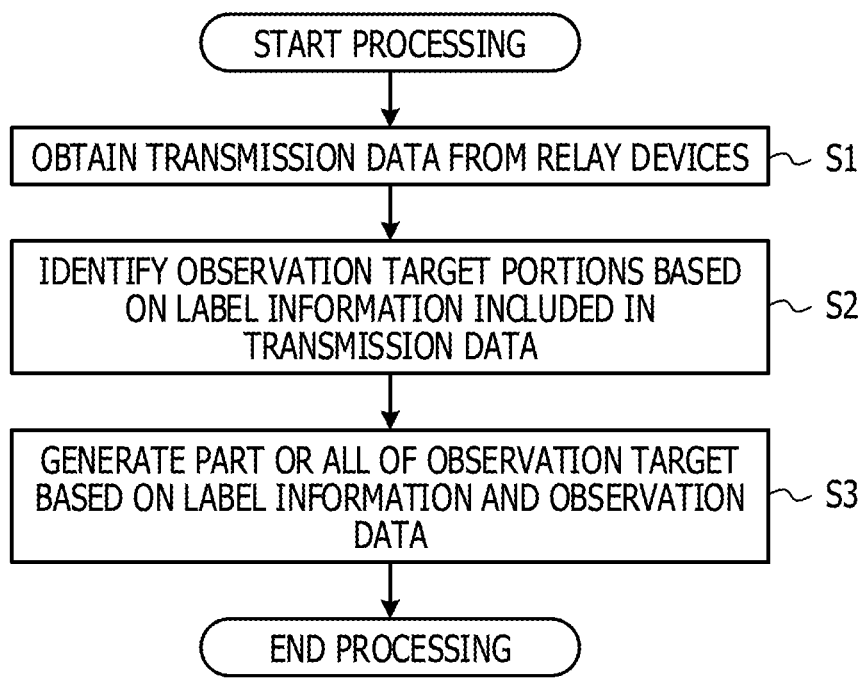
FIG. 9 is a flowchart illustrating an example of a flow of processing according to the embodiment.

Referring to a flowchart illustrated in FIG. 9, a flow of processing according to the embodiment is described. The obtaining section 21 of the higher device 2 obtains the transmission data from the relay devices 3A to 3C through the communicating section 13 (step S1). The transmission data includes the pieces of the image data of the observation target portions the images of which are captured by the cameras 4 and the label information identifying the observation target portions.

The generating section 22 identifies the observation target portions based on the label information included in the obtained transmission data (step S2). The generating section 22 generates part or all of the image data of the observation target based on the observation target portions identified from the label information and the pieces of the image data included in the transmission data (step S3).

It is assumed that, for example, the obtaining section 21 obtains the piece of the image data of the observation target portion X1 from the relay device 3A, the piece of the image data of the observation target portion X2 from the relay device 3B, and the piece of the image data of the observation target portion X3 from the relay device 3C.

In the above-described case, the generating section 22 generates the image data of the observation target X from the pieces of the image data of the observation target portions X1, X2, X3 based on the label information identifying the observation target portions X1, X2, X3.

In another case, it is assumed that the obtaining section 21 obtains the piece of the image data of the observation target portion X1 from the relay device 3A and the piece of the image data of the observation target portion X2 from the relay device 3B. In this case, the generating section 22 generates image data of a part including the observation target portions X1, X2 from the pieces of the image data of the observation target portions X1, X2 based on the label information identifying the observation target portions X1, X2.

<A Flowchart Illustrating an Example of a Flow of Change Control Processing>

Figure 10:
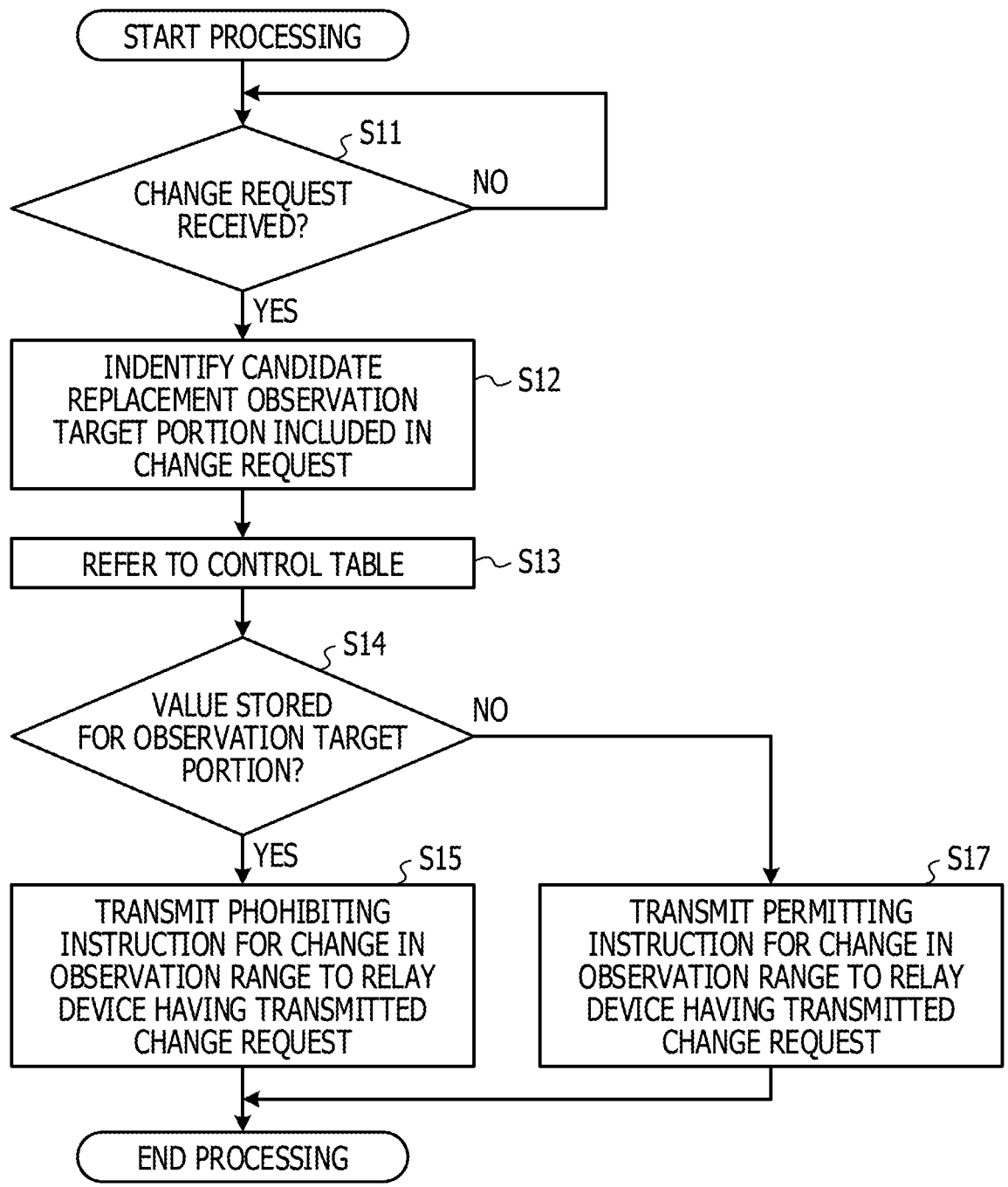
FIG. 10 is a flowchart illustrating an example of a flow of change control processing.

Referring to a flowchart illustrated in FIG. 10, a flow of change control processing is described. The change control section 23 determines whether a change request has been received from any one of the relay devices 3A to 3C (step S11). In the case of "NO" in step S11, the processing does not proceed to the next step.

In the case of "YES" in step S11, the change control section 23 identifies the candidate replacement observation target portion included in the change request (step S12). Then, the change control section 23 refers to the control table stored in the storage section 12 (step S13).

The change control section 23 determines whether a value is stored in a cell of the control table corresponding to the candidate replacement observation target portion included in the change request (step S14). In the case of "YES" in step S14, the change control section 23 transmits to one of the relay devices 3 which is the source of the change request through the communicating section 13 an instruction to prohibit a change in the observation range of the camera 4 (change prohibiting instruction) (step S15).

In the case of "NO" in step S14, the change control section 23 transmits to the relay device 3 which is the source of the change request through the communicating section 13 an instruction to permit a change in the observation range of the camera 4 (change permitting instruction) (step S16).

<An Example of a Hardware Configuration of the Higher Device>

Figure 11:
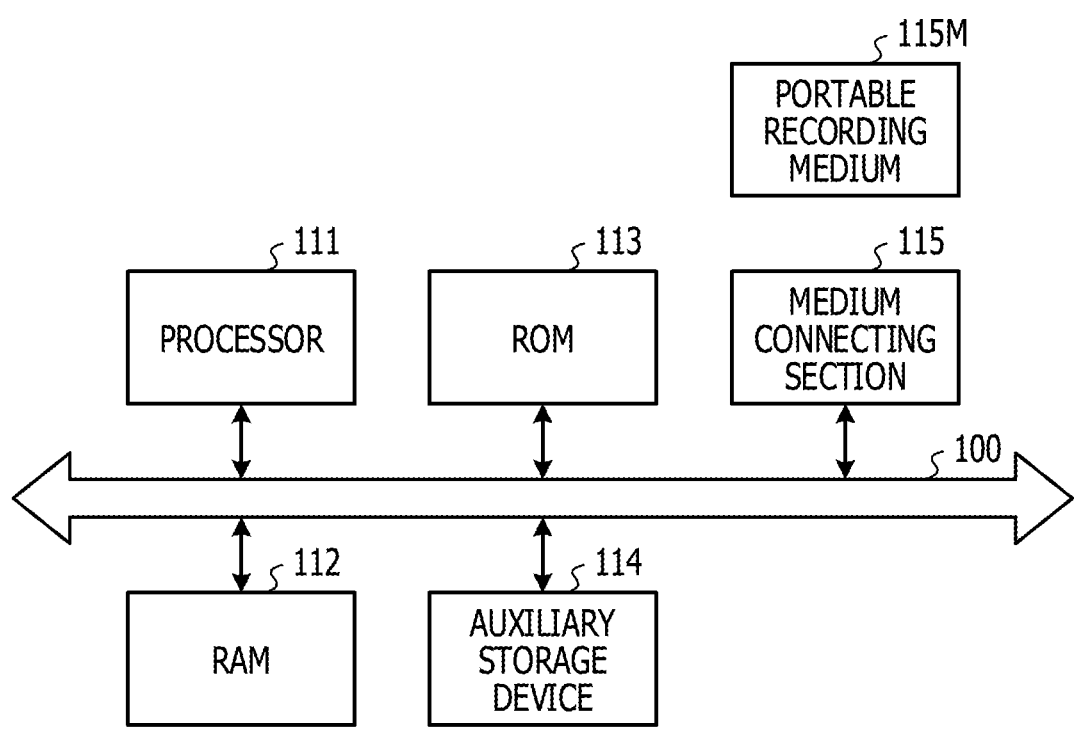
FIG. 11 illustrates an example of a hardware configuration of the higher device.

Referring next to FIG. 11, an example of a hardware configuration of the higher device 2 is described. As illustrated in the example of FIG. 11, a processor 111, a random-access memory (RAM) 112, and a read-only memory (ROM) 113 are connected to a bus 100. An auxiliary storage device 114 and a medium connecting section 115 are also connected to the bus 100. The relay device 3 may include a processor, a RAM, and a ROM as well.

The processor 111 executes a program that has been loaded in the RAM 112 and includes a plurality of instructions. As the program to be executed, a program performing the processing according to the embodiment may be used.

The ROM 113 is a non-volatile storage device that stores the program to be loaded in the RAM 112. The auxiliary storage device 114 stores various types of information. For example, a hard-disk drive, a semiconductor memory, or the like may be used for the auxiliary storage device 114. The medium connecting section 115 is connectable to a portable recording medium 115M.

As the portable recording medium 115M, a portable memory (for example, an optical disk, a semiconductor memory, or the like) may be used. The program performing the processing according to the embodiment may be recorded in this portable recording medium 115M. The above-described controller 11 may be realized by executing the program including the plurality of given instructions by using the processor 111.

The RAM 112, the ROM 113, the auxiliary storage device 114, and the portable recording medium 115M are examples of a computer-readable tangible recording medium. Each of these tangible recording media is not a temporary medium such as a signal carrier wave.

<Others>

According to the above-described embodiment, it is assumed that observing sections including first observing section and the second observing section are cameras 4. However, the observing sections may be other elements than the cameras. For example, the observing sections may be microphones (referred to as "mics" hereafter).

FIG. 12 illustrates an example of an observation system for which mics are used as the observing sections. Mics 5-1 to 5-9 (collectively referred to as "mics 5" hereinafter) collect, for example, sound in a meeting about confidential information held in a meeting room or the like. The sound collected by the mics 5 is an example of the observation target.

A plurality of the mics 5 may be connected to each of the relay devices 3A to 3C, and the different mics 5 may collect the sound of different frequency bands. For example, the mics 5-1, 5-4, 5-7 that observe the observation target X collect the sound of different frequency bands.

The mic 5-1 transmits to the relay device 3A collected voice data of a first frequency band. The mic 5-4 transmits to the relay device 3B collected voice data of a second frequency band. The mic 5-7 transmits to the relay device 3C collected voice data of a third frequency band. The first to third frequency bands are bands of different frequencies.

For example, even when the relay device 3A becomes under control of an external computer due to a malicious attack and the voice data of the first frequency band leaks, neither the voice data of the second frequency band nor the voice data of the third frequency band leaks.

Even when the voice data of one of three frequency bands leaks, it is difficult to identify content of the voice from the voice data of a single frequency band. Accordingly, damage caused by the leakage of the voice data may be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An observation system comprising:
a plurality of sensors including a first sensor and a second sensor; and
a control device configured to collect observation data from each of the plurality of sensors via an internet, wherein
the first sensor is configured to observe a first portion of a target object to generate first observation data, the first portion indicating a part of the target object, the first observation data including image data indicating a first characteristic observed from the first portion of the target object, the first sensor being configured to establish a first communication path with the control device via a first relay device, the first communication path being a communication path between the first sensor and the control device via the first relay device,
the second sensor is configured to observe a second portion of the target object to generate second observation data, the second portion indicating another part of the target object and excluding at least a part of the first portion, the second observation data including image data indicating a second characteristic observed from the second portion of the target object, the second sensor being configured to establish a second communication path with the control device via a second relay device except for the first relay device, the second communication path being a communication path between the second sensor and the control device via the second relay device except for the first relay device, the control device is configured to communicate with each of the plurality of sensors through the internet, the control device including a memory and a processor coupled to the memory, the processor being configured to:

collect, through the internet, the first observation data from the first sensor via the first relay device, the collected first observation data including first image data observed by the first sensor, the first image data being image data indicating the first characteristic observed from the first portion of the target object; and collect, through the internet, the second observation data from the second sensor via the second relay device, the collected second observation data including second image data observed by the second sensor, the second image data being image data including image data indicating the second characteristic observed from the second portion of the target object, wherein the first communication path used for collecting of the first observation data is configured such that when the first observation data is transmitted from the first sensor to the control device via the first relay device, the first observation data is not relayed by the second relay device, and wherein the second communication path used for collecting of the second observation data is configured such that when the second observation data is transmitted from the second sensor to the control device via the second relay device, the second observation data is not relayed by the first relay device.

2. The observation system according to claim 1, wherein the processor is configured to perform generation of integrated observation data based on the received first observation data and the received second observation data.

3. The observation system according to claim 2, wherein the processor is configured to
receive first information in association with the first observation data from the first relay device, the first information indicating a position of the first portion, and
receive second information indicating the second portion in association with the second observation data from the second relay device, the second information indicating a position of the second portion, and
the generation of the integrated observation data is performed by using the first information and the second information.

4. The observation system according to claim 1, wherein the processor is configured to
cause a third sensor to transmit third observation data via the first relay device from among the plurality of relay device, the third sensor being configured to observe a third portion of another observation target, the third observation data indicating an observation result obtained by the third sensor from the third portion of the other target object, the third portion indicating a part of the other target object and excluding at least the first portion of the observation target,
receive the third observation data from the third sensor via the first relay device.

5. The observation system according to claim 1, wherein in response to receiving a request from the first relay device to change an observation position of the first sensor, the processor is configured to,
when a third sensor does not observe a third portion of another observation target designated by the request, permit a change of the observation position from the first portion into the third portion, and
when the third sensor observes the third portion of the other observation target designated by the request, deny the change of the observation position from the first portion into the third portion.

6. The observation system according to claim 1, wherein the first sensor and the second sensor are image capturing devices.

7. The observation system according to claim 1, wherein the first sensor is a microphone configured to collect sound of a frequency band and the second sensor is a microphone configured to collect sound of another frequency band.

8. A computer-implemented observation method performed in an observation system, the observation system including a control device and a plurality of sensors including a first sensor and a second sensor, the control device being configured to collect observation data from each of the plurality of sensors via an internet, the computer-implemented observation method comprising:
causing the first sensor to observe a first portion of a target object to generate first observation data, the first portion indicating a part of the target object, the first observation data including image data indicating a first characteristic observed from the first portion of the target object, the first sensor being configured to establish a first communication path with the control device via a first relay device, the first communication path being a communication path between the first sensor and the control device via the first relay device;
causing the second sensor to observe a second portion of the target object to generate second observation data, the second portion indicating another part of the target object and excluding at least a part of the first portion, the second observation data including image data indicating a second characteristic observed from the second portion of the target object, the second sensor being configured to establish a second communication path with the control device via a second relay device except for the first relay device, the second communication path being a communication path between the second sensor and the control device via the second relay device except for the first relay device;
collecting, through the internet, the first observation data from the first sensor via the first relay device, wherein the collected first observation data includes the first image data observed by the first sensor, the first image data being image data indicating the first characteristic observed from the first portion of the target object; and
collecting, through the internet, the second observation data from the second sensor via the second relay device, wherein the collected second observation data includes second image data observed by the second sensor, the second image data being image data indicating the second characteristic observed from the second portion of the target object, wherein the first communication path used for collecting of the first observation data is configured such that when the first observation data is transmitted from the first sensor to the control device via the first relay device, the first observation data is not relayed by the second relay device, wherein the second communication path used for collecting of the second observation data is configured such that when the second observation data is transmitted from the second sensor to the control device via the second relay device, the second observation data is not relayed by the first relay device.

9. The observation method according to claim 8, further comprising:
generating, by the control device, integrated observation data based on the received first observation data and the received second observation data.

10. The observation method according to claim 9, further comprising:
causing the first relay device to transmit first information in association with the first observation data, the first information indicating a position of the first portion; and
causing the second relay device to transmit second information in association with the second observation data, the second information indicating a position of the second portion, wherein the generating of the integrated observation data is performed by using the first information and the second information.

11. The observation method according to claim 8, further comprising:
causing a third sensor to transmit third observation data via the first relay device from among the plurality of relay devices, the third sensor being configured to observe a third portion of another observation target, the third observation data indicating an observation result obtained by the third sensor from the third portion of the other target object, the third portion indicating a part of the other target object and excluding at least the first portion of the observation target; and
receiving, by the control device, the third observation data from the third sensor via the first relay device.

12. The observation method according to claim 8, further comprising:
receiving, by the control device, a request from the first relay device to change an observation position of the first sensor;
when a third sensor does not observe a third portion of another observation target designated by the request, permitting, by the control device, a change of the observation position from the first portion into the third portion; and
when the third sensor observes the third portion of the other observation target designated by the request, denying, by the control device, the change of the observation position from the first portion into the third portion.

13. The observation method according to claim 8, wherein the first sensor and the second sensor are image capturing devices.

14. The observation method according to claim 8, wherein the first sensor is a microphone configured to collect sound of a frequency band and the second sensor is a microphone configured to collect sound of another frequency band.

15. A control apparatus used in an observation system, the observation system including a plurality of sensors including a first sensor and a second sensor, the control apparatus comprising:
a memory; and
a processor circuit coupled to the memory, the processor circuit being configured to execute processing including:
causing the first sensor to observe a first portion of a target object to generate first observation data, the first portion indicating a part of the target object, the first observation data including image data indicating a first characteristic observed from the first portion of the target object, the first sensor being configured to establish a first communication path with the control device via a first relay device, the first communication path being a communication path between the first sensor and the control device via the first relay device;
causing the second sensor to observe a second portion of the target object to generate second observation data, the second portion indicating another part of the target object and excluding at least a part of the first portion, the second observation data including image data indicating a second characteristic observed from the second portion of the target object, the second sensor being configured to establish a second communication path with the control device via a second relay device except for the first relay device, the second communication path being a communication path between the second sensor and the control device via the second relay device except for the first relay device;
collecting, through the internet, the first observation data from the first sensor via the first relay device, wherein the collected first observation data includes the first image data observed by the first sensor, the first image data being image data indicating the first characteristic observed from the first portion of the target object; and
collecting, through the internet, the second observation data from the second sensor via the second relay device, wherein the collected second observation data includes second image data observed by the second sensor, the second image data being image data indicating the second characteristic observed from the second portion of the target object,
wherein the first communication path used for collecting of the first observation data is configured such that when the first observation data is transmitted from the first sensor to the control device via the first relay device, the first observation data is not relayed by the second relay device,
wherein the second communication path used for collecting of the second observation data is configured such that when the second observation data is transmitted from the second sensor to the control device via the second relay device, the second observation data is not relayed by the first relay device.

16. The control apparatus according to claim 15, wherein the processing further includes generating integrated observation data based on the received first observation data and the received second observation data.

17. The control apparatus according to claim 16, wherein the processing further includes:
causing the first relay device to transmit first information in association with the first observation data, the first information indicating a position of the first portion; and causing the second relay device to transmit second information in association with the second observation data, the second information indicating a position of the second portion, wherein the generating of the integrated observation data is performed by using the first information and the second information.

18. The observation apparatus according to claim 15, wherein the processing further includes:

causing a third sensor to transmit third observation data via the first relay device from among the plurality of relay devices, the third sensor being configured to observe a third portion of another observation target, the third observation data indicating an observation result obtained by the third sensor from the third portion of the other target object, the third portion indicating a part of the other target object and excluding at least the first portion of the observation target; and receiving the third observation data from the third sensor via the first relay device.

19. The control apparatus according to claim 15, wherein the processing further includes:

receiving a request from the first relay device to change an observation position of the first sensor;

when a third sensor does not observe a third portion of another observation target designated by the request, permitting a change of the observation position from the first portion into the third portion; and when the third sensor observes the third portion of the other observation target designated by the request, denying the change of the observation position from the first portion into the third portion.

20. The control apparatus according to claim 15, wherein the first sensor and the second sensor are image capturing devices.

* * * * *